United States Patent Office 3,778,406
Patented Dec. 11, 1973

3,778,406
PROCESS FOR IMPROVING ADHERENCE OF RUBBER MIXTURES TO TEXTILE FABRICS
Erhard Klötzer, Hanau am Main, and Johannes Pochert, Wessling, near Cologne, Germany, assignors to Deutsche Gold- und Silber-Scheideanstalt vormals Roessler, Frankfurt am Main, Germany
No Drawing. Continuation of application Ser. No. 845,649, July 9, 1969, which is a continuation of application Ser. No. 620,634, Mar. 6, 1967, both now abandoned. This application Dec. 14, 1970, Ser. No. 98,172
Claims priority, application Germany, Mar. 8, 1966, D 49,530; July 6, 1966, D 50,489
Int. Cl. C08c *11/02, 11/10;* C08d *9/10*
U.S. Cl. 260—41.5 A                  6 Claims

ABSTRACT OF THE DISCLOSURE

Method of improving bond between textiles and rubber vulcanizates obtained by vulcanizing filler containing rubber mixtures and resin forming mixtures of amines or phenols and aldehydes capable of forming resins wherein finely divided active reenforcing silica and/or aluminum silicate and/or calcium silicate and/or calcium carbonate is employed as a filler improving the bond obtained. Further improvement in bond obtained by addition of lead oxide to rubber mixture. Still further improvement obtained by adding resin forming components, particularly, the phenol, in the form of a premix with the filler.

CROSS-REFERENCE TO RELATED APPLICATIONS

The present application is a continuation of application Ser. No. 845,649, filed July 9, 1969, and now abandoned, which is a continuation of application Ser. No. 620,634, filed Mar. 6, 1967, and now abandoned.

BACKGROUND OF THE INVENTION

The present invention relates to a method of improving the adherence of rubber mixtures of natural or synthetic rubber to carrier materials such as prepared or unprepared textile fabrics.

Rubber articles which are subjected to considerable dynamic stresses, such as vehicle tires, conveyor belts or driving belts, in general are reenforced with textiles in the form of cords or woven fabrics. It is of particular importance that the rubber layer adheres as firmly as possible to the reenforcing textile regardless of whether the textile fibers concerned are natural or synthetic fibers of, for instance, polyester (Trevira), polyamides (nylon or Perlon). As is known, the textiles are prepared for this purpose with a rubber latex and a phenol-formaldehyde condensation product, resorcinol usually being used as the phenol. Such resin component on one hand undergoes a reaction with functional groups of the textile material concerned and on the other hand also reacts with the conjugated system of the elastomer and thereby causes the bonding of the rubber layer applied to the textile.

When the elastomer, whether it be natural or synthetic rubber, is reenforced as usual with carbon black and resorcinol and hexamethylene tetramine (formaldehyde source) are added thereto, the resin formation takes place during the vulcanization and thereby effects a bond between the rubber layer and the prepared or unprepared textile. The raised requirements which must be met in practice by such laminates require as great adherence as possible of the elastomer to the textile so that even when they are subjected to high dynamic stresses the reenforced rubber layer does not separate from the textile fabric.

SUMMARY OF THE INVENTION

The object of the present invention is to provide a method of improving the adherence or bond of rubber mixtures of natural or synthetic rubber containing active reenforcing filler to prepared or unprepared textile fabrics, obtained with the aid of condensation products of phenols or amines with aldehydes capable of forming resins therewith, by vulcanizing the mixtures onto the carrier material.

According to the invention it was found that this object could be achieved by adding extremely finely divided active silica and/or aluminum silicate and/or calcium silicate and/or calcium carbonate either alone or in combination with carbon black to the rubber mixture, preferably, in quantities between 10 to 100 wt. parts per 100 wt. parts of the rubber contained therein.

DETAILED DESCRIPTION OF THE INVENTION INCLUDING PREFERRED EMBODIMENTS THEREOF

According to the invention it was unexpectedly found that when the finely divided "white" fillers indicated above and especially of finely divided active silica and the resin forming components were added to a rubber mixture, an exchange reaction between the active silanol groups on the silica surface and the functional groups of the textile material concerned takes place during the resin formation occurring while the mixture is vulcanized. True chemical and chemosorptive bonds are produced which do not occur when carbon black is used as a filler because of its different type of surface characteristics with reference to the functional groups. As a consequence, the rubber silica mixture exhibits a considerably better adherence to synthetic fibers, especially those of polyamides such as nylon or Perlon, rayon or polyesters.

Suitable silicas, for the purposes of the present invention, for instance, are those precipitated in finely divided amorphous form from water glass with the aid of acids or those produced directly as a fine powder by thermal methods, such as, for example, the pyrogenic silicas, Cabosil and Aerosil, which have a specific surface area according to BET of 30 to 400 m.$^2$/g. and an average primary particle size of 10–400 m$\mu$.

The fillers, as already indicated, expediently are employed in quantities between 10 and 100 wt. parts per 100 wt. parts of the rubber.

It furthermore was found that the usually rather difficult distribution of resorcinol, which is the most preferred phenol employed as resin component, which is dependent to a considerable extent upon the mixing procedure used, for example, in the kneader or on rolls, can be considerably improved by first intimately mixing the resin components with the finely divided active white fillers employed, such as, silica and/or aluminum silicate and/or calcium silicate and/or calcium carbonate, either by grinding or, absorptively, by applying the resin forming components in the form of a solution and only then mixing such intimate mixture with the rubber mixture before it is vulcanized onto the textile fabric. In view of the easier distribution of the resorcinol in the rubber mixture a considerably improved bond to the textile fabric is rendered possible.

It also was found unexpectedly that a further improvement in the bond of the rubber mixture to the textile fabric could be achieved by addition of heavy metal oxides, especially, lead oxide to such mixtures.

The following examples will serve to illustrate the invention. Examples 1 to 3 illustrate the improved bond attainable with the addition of silica alone or in combination with carbon black, without prior mixing of the resin forming components with such silica. Examples 2 and 3 also include a heavy metal oxide such as lead oxide. Example 4 shows the improved bond attainable when, for example, the resorcinol component is intimately premixed with the silica before the latter is mixed with the rubber mixture. The proportions are given in parts by weight unless specified otherwise.

EXAMPLE 1

Natural rubber was used in these comparative tests and, the reenforcing filler, gas black or active finely divided precipitated silica, first worked into it. The resin components were then incorporated in the mixtures and the mixtures then vulcanized according to the following recipes:

|  | Gas black mixture | Silica mixture |
|---|---|---|
| Components: |  |  |
| Natural rubber | 100 | 100 |
| Filler | 25 | 30 |
| Zinc oxide | 10 | 3 |
| Stearic acid | 2.5 | 2.5 |
| Resorcinol | 2.5 | 2.5 |
| Hexamethylene tetramine | 1.5 | 2.5 |
| Phenyl-$\beta$-naphthylamine | 1.5 | 1.5 |
| Sulfur | 2.5 | 2.3 |
| Mercaptobenzothiazoldisulfide |  | 0.8 |
| Sulfene amide accelerator (Vulcazit MOZ= benzothiazole-2-sulfene morpholide) | 1.0 |  |
| High aromatic softener (Naftolene Z.D.: Mixture of unsaturated high molecular weight hydrocarbons) |  | 5.0 |
| Vulcanization temperature: 145° C. for 40'. |  |  |
| Bonding value, kg./each 3 cm. width of sample: |  |  |
| Non-impregnated polyester fiber Trevira | 2.4 | 2.8 |
| Polyamide fiber nylon | 7.0 | 16.0 |
| Polyamide fiber Perlon | 6.5 | 15.0 |

The bonding values when silica was used showed a decided improvement which especially on polyamide fibers rise to double the values obtained with the gas black. The improved bonding values provide an increased life and an improved operating safety in all rubber articles subjected to high dynamic stresses.

Natural rubber and synthetic rubber was employed in Examples 2 and 3 and the reenforcing filler, active silica or active silica in combination with active carbon black, was worked in first. The resin components were then incorporated in the mixtures and the mixtures then vulcanized according to the recipes given in the examples.

EXAMPLE 2

[Natural rubber]

|  | Mixture without heavy metal oxide addition | | Mixture with heavy metal oxide addition | | |
|---|---|---|---|---|---|
|  | Carbon black | SiO$_2$ | SiO$_2$ | Carbon black + | SiO$_2$ |
| Composition of mixture: |  |  |  |  |  |
| Natural rubber | 100 | 100 | 100 | 100 | 100 |
| Stearic acid | 3 | 3 | 3 | 3 | 3 |
| Resorcinol | 2.5 | 2.5 | 2.5 | 2.5 | 2.5 |
| Phenyl-$\beta$-naphthylamine | 1.0 | 1.0 | 1.0 | 1.0 | 1.0 |
| High aromatic softener (Naphtolen ZD) | 7.0 | 7.0 | 7.0 | 7.0 | 7.0 |
| Sulfur | 2.5 | 2.5 | 2.5 | 2.5 | 2.5 |
| Hexamethylene tetramine | 1.5 | 1.5 | 1.5 | 1.5 | 1.5 |
| Sulfene amide accelerator (Vulcazit MOZ) | 1.0 | 1.0 | 1.0 | 1.0 | 1.0 |
| Diphenylguanidine |  | 0.8 |  |  |  |
| Zinc oxide | 10 | 10 | 7 | 8 | 8 |
| PbO |  |  | 3 | 2 | 2 |
| Active carbon black (CK 3, gas black, granulated) | 45 |  |  | 30 | 25 |
| Active precipitated silica (Ultrasil VN 3) |  | 45 | 45 | 15 | 25 |
| Vulcanization: 40'/145° C. |  |  |  |  |  |
| Bonding values (kg./3 cm.): |  |  |  |  |  |
| On polyester fibers | 11.6 | 21.1 | 25.8 | 26.3 | 26.0 |
| On polyamide fibers (nylon) | 10.8 | 20.6 | 35.2 | 35.7 | 34.1 |

EXAMPLE 3

[Synthetic rubber]

|  | Mixture without heavy metal oxide addition | | Mixture with heavy metal oxide addition | | |
|---|---|---|---|---|---|
|  | Carbon black | SiO$_2$ | SiO$_2$ | Carbon black + | SiO$_2$ |
| Composition of mixture: |  |  |  |  |  |
| Styrene butadiene rubber (Büna Hüls) | 100 | 100 | 100 | 100 | 100 |
| Stearic acid | 3 | 3 | 3 | 3 | 3 |
| Resorcinol | 2.5 | 2.5 | 2.5 | 2.5 | 2.5 |
| Phenyl-$\beta$-naphthylamine | 1.0 | 1.0 | 1.0 | 1.0 | 1.0 |
| High aromatic softener (Naftolen ZD) | 7.0 | 7.0 | 7.0 | 7.0 | 7.0 |
| Sulfur | 2.5 | 2.5 | 2.5 | 2.5 | 2.5 |
| Hexamethylene tetramine | 1.5 | 1.5 | 1.5 | 1.5 | 1.5 |
| Sulfene amide accelerator (Vulcazit MOZ) | 1.2 | 1.2 | 1.2 | 1.2 | 1.2 |
| Diphenyl guanidine |  | 1.0 |  |  |  |
| Zinc oxide | 10 | 10 | 7 | 8 | 8 |
| PbO |  |  | 3 | 2 | 2 |
| Active carbon (CK 3) | 45 |  |  | 30 | 25 |
| Active precipitated silica (Ultrasil VN 3) |  | 45 | 45 | 15 | 25 |
| Vulcanization: 40'/145° C. |  |  |  |  |  |
| Bonding value (kg./3 cm.): |  |  |  |  |  |
| On non-impregnated polyester fibers | 10.2 | 18.3 | 20.6 | 21.2 | 21.7 |
| On non-impregnated polyamide fibers (Nylon) | 9.5 | 19.0 | 30.1 | 30.9 | 30.3 |

EXAMPLE 4

The comparative tests in this example indicate the improvement in the bonding values attainable when the resorcinol resin component is intimately premixed with the fillers by grinding. In grinding the resin component, particularly, resorcinol, with the silica expediently the ratios are maintained between 1:5 and 5:1 parts by weight.

An unprepared polyamide fiber fabric was employed as reenforcement and natural rubber was used as elastomer.

The rubber technical investigations indicated that with the premixing according to the invention a considerably better distribution of the resorcinol in the elastomer could be achieved even when mixing procedures less favorable for effecting uniform distribution such as mixing on rolls rather than in kneaders are used. Such improved distribution is evidenced by the improved bonding values for the vulcanizate on the textile reenforcement.

In test 1 of the following table, 15 parts of active silica and 3 parts of resorcinol (a total of 18 parts) were added separately to the rubber mixture and mixed therewith in a kneader to ensure as good a distribution as possible. In tests 2-5, premixtures of resorcinol and the active silica were first prepared in the proportion indicated and such premixes, supplemented with further finely divided active silica to provide a total of 18 parts, were then added to the rubber sheet on a mixing roller. Therefore in tests 2-5 the resorcinol-silica premixes were intentionally mixed into the rubber batch under less favorable conditions than is the case with mixing in a kneader. In spite of this, the bonding values attained raised from 38 kg./3 cm. bond width when premixing was not used to 55-62 kg./3 cm. bond width when premixing was used. The increase therefore was 45-63%. The bonding values were obtained by determining the force required to pull off a 3 cm. wide strip of vulcanizate from the textile backing.

The 5 tests which are tabulated below indicate the increases in bonding values which may be achieved using the premix procedure according to the invention.

| Tests | 1 | 2 | 3 | 4 | 5 |
|---|---|---|---|---|---|
| Recipe: | | | | | |
| Natural rubber | 100 | 100 | 100 | 100 | 100 |
| Stearic acid | 3 | 3 | 3 | 3 | 3 |
| Phenyl-β-naphthylamine | 1 | 1 | 1 | 1 | 1 |
| High aromatic softener (Naftolen ZD) | 7 | 7 | 7 | 7 | 7 |
| Sulfene amide accelerator (Vulcazit MOZ) | 1 | 1 | 1 | 1 | 1 |
| Hexamethylene tetramine | 1.6 | 1.6 | 1.6 | 1.6 | 1.6 |
| Sulfur | 2.5 | 2.5 | 2.5 | 2.5 | 2.5 |
| Active carbon black (Corax G) | 30 | 30 | 30 | 30 | 30 |
| Zinc oxide | 8 | 8 | 8 | 8 | 8 |
| PbO | 2 | 2 | 2 | 2 | 2 |
| Active silica (Ultrasil VN 3) | 15 | | 12 | 13.5 | 14 |
| Resorcinol | 3 | | | | |
| Resorcinol-VN 3: | | | | | |
| 1:5 | | 18 | | | |
| 1:1 | | | 6 | | |
| 2:1 | | | | 4.5 | |
| 3:1 | | | | | 4 |
| Vulcanization: 40'/145° C. | | | | | |
| Bond (kg./3 cm.) polyamide unprepared | 38 | 60 | 55 | 62 | 56 |

As has already been indicated, the resorcinol can also be dissolved in a suitable solvent, such as, toluene and applied directly to the silica as carrier substance whereby such resorcinol is bound absorptively. After drying, with recovery of the solvent, the "coated" silica can be added in powder form to the rubber batch on a roller or in a kneader.

The other resin component, such as the hexamethylene tetramine used as aldehyde source, can be premixed with the silica for purposes of better distribution and ease of mixing into the rubber batch in the proportions indicated either by grinding or by absorption from an aqueous solution. The addition to the rubber batch is effected after the premix of the first component has been mixed in. The quantity of additional silica is adjusted in each instance so that a total of 18 parts of silica are provided for each 100 parts of elastomer. If desired, active carbon black can be added as an additional filler. The bond to the textile is furthermore provided by the intimate contact of the silanol groups on the silica surface with the functional groups of the elastomer.

According to the bond strength compounds with finely divided precipitated calcium silicates, aluminum silicates and calcium carbonates under analogous formulations and vulcanization conditions give the following values:

21 kg./3 cm.
29 kg./3 cm.
18 kg./3 cm.

What is claimed is:

1. The process of forming a composite rubber-textile product, wherein a natural rubber or a styrene butadiene rubber is firmly bonded to a textile support, the said process comprising the steps of forming an intimate premix of (a) a finely divided active silica of a specific surface area of 30 to 400 m.$^2$/g. BET and an average primary particle size of 10 to 400 m$\mu$ and (b) resorcinol; mixing the said premix with the rubber, incorporating hexamethylene tetramine, litharge, zinc oxide and sulfur in the rubber, the amount of silica being between about 10 and 100 parts by weight per 100 parts of rubber, the ratio of resorcinol to hexamethylenetetramine being between about 1:0.5 and 1:1, the ratio of resorcinol to silica being between about 1:5 and 1:18, the ratio of hexamethylenetetramine to silica being about 1:8 and 1:30 by weight, the amount of litharge being between about 2 and 3 parts by weight and the amount of zinc oxide being between about 7 and 10 parts by weight per 100 parts of rubber, and thereupon vulcanizing the thus modified rubber directly onto the textile support.

2. The process of claim 1, wherein the resorcinol is ground together with the silica whereupon the premix is added to the rubber which already contains the hexamethylene tetramine.

3. The process of claim 1, wherein a solution of the resorcinol is first applied by adsorption to at least part of said finely divided active silica whereupon the thus-treated filler is added to the rubber which already contains the hexamethylenetetramine.

4. The process of claim 1, wherein carbon black is added to the rubber in addition to the silica.

5. The process of claim 1 wherein the textile support is composed of polyester, polyamide or rayon fiber.

6. The process of claim 1 wherein the vulcanization time is about 40 minutes and the vulcanization temperature is about 145° C.

References Cited

UNITED STATES PATENTS 3,298,984  1/1967  Rye _____ 260—41.5 RX
3,451,458  6/1969  Stueber _____ 260—41.5 AX

OTHER REFERENCES

Shchichko, "The Use of Compounds of . . .," Soviet Rubber Technology, vol. 25, No. 1, January 1966, pp. 18–21.

Hoffman, "Vulcanization and Vulcanizing Agents," Palmerton Publishing Co., New York, 1968, TS 1891 H6 C. 2, pp. 256–257 and 355–356.

ALLAN LIEBERMAN, Primary Examiner

H. H. FLETCHER, Assistant Examiner

U.S. Cl. X.R.

117—138.8 F, 138.8 N, 146; 152—330; 156—110 A; 260—3, 41.5 A, 763, 766, 846; 106—308 N, 309